(12) United States Patent
Hobler

(10) Patent No.: US 7,966,445 B2
(45) Date of Patent: Jun. 21, 2011

(54) READ STATUS CONTROLLER

(75) Inventor: Jason Hobler, Raleigh, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 301 days.

(21) Appl. No.: 11/963,984

(22) Filed: Dec. 24, 2007

(65) Prior Publication Data

US 2009/0164683 A1    Jun. 25, 2009

(51) Int. Cl.
*G06F 12/00* (2006.01)

(52) U.S. Cl. .................... 711/100; 711/103; 711/156

(58) Field of Classification Search .............. None
See application file for complete search history.

(56) References Cited

U.S. PATENT DOCUMENTS

| | | | |
|---|---|---|---|
| 5,457,787 A | 10/1995 | Asano et al. | |
| 5,640,349 A | 6/1997 | Kakinuma et al. | |
| 5,799,168 A | 8/1998 | Ban | |
| 5,956,743 A | 9/1999 | Bruce et al. | |
| 6,078,520 A * | 6/2000 | Tobita et al. | 365/185.09 |
| 6,249,461 B1 | 6/2001 | Choi et al. | |
| 6,442,076 B1 | 8/2002 | Roohparvar | |
| 6,496,900 B1 * | 12/2002 | McDonald et al. | 711/112 |
| 6,606,269 B2 | 8/2003 | Roohparvar | |
| 6,657,899 B2 | 12/2003 | Roohparvar | |
| 6,985,778 B2 | 1/2006 | Kim et al. | |
| 2002/0166061 A1 | 11/2002 | Falik et al. | |

FOREIGN PATENT DOCUMENTS

EP    1367496 A2 * 12/2003

OTHER PUBLICATIONS

Wu, C., et al.: "Energy-efficient flash-memory storage systems with an interrupt-emulation mechanism". Hardware/Software Codesign and System Syntheses, 2004. Codes + ISSS 2004. International Conference on. Sep. 2004, pp. 134-139.
Min, S. et al.: "Current trends in flash memory technology", Design Automation, 2006. Asia and South Pacific Conference on, Jan. 2006, ISBN: 0-7803-9451-8.
"NAND01G-B, NAND02G-B 1 Gbit, 2Gbit, 2112 Byte/1056 Word Page, 1.8V/3V, NAND Flash Memory" STMicroelectronics, Rev 4.0, Feb. 2006.
EPO, International Search Report, Apr. 22, 2008, in connection with counterpart International Application No. PCT/EP2008/068248.
EPO, Written Opinion, Apr. 22, 2008, in connection with counterpart International Application No. PCT/EP2008/068248.

* cited by examiner

*Primary Examiner* — Shawn X Gu
(74) *Attorney, Agent, or Firm* — Potomac Patent Group PLLC

(57) ABSTRACT

A controller in a processing system can detect programmable bit sequences sent from a host processor to an external device, such as a memory, indicating whether a response from the external device needs to be read. The controller can also read a response from the external device and act appropriately, e.g., determine if an error has occurred by comparing the device's actual response to one or more programmably determined responses. Upon reading a particular response, e.g., a response indicating an error, the controller can issue an interrupt request to the host processor for further action. The controller can also track which external device access caused a particular response to occur.

18 Claims, 4 Drawing Sheets

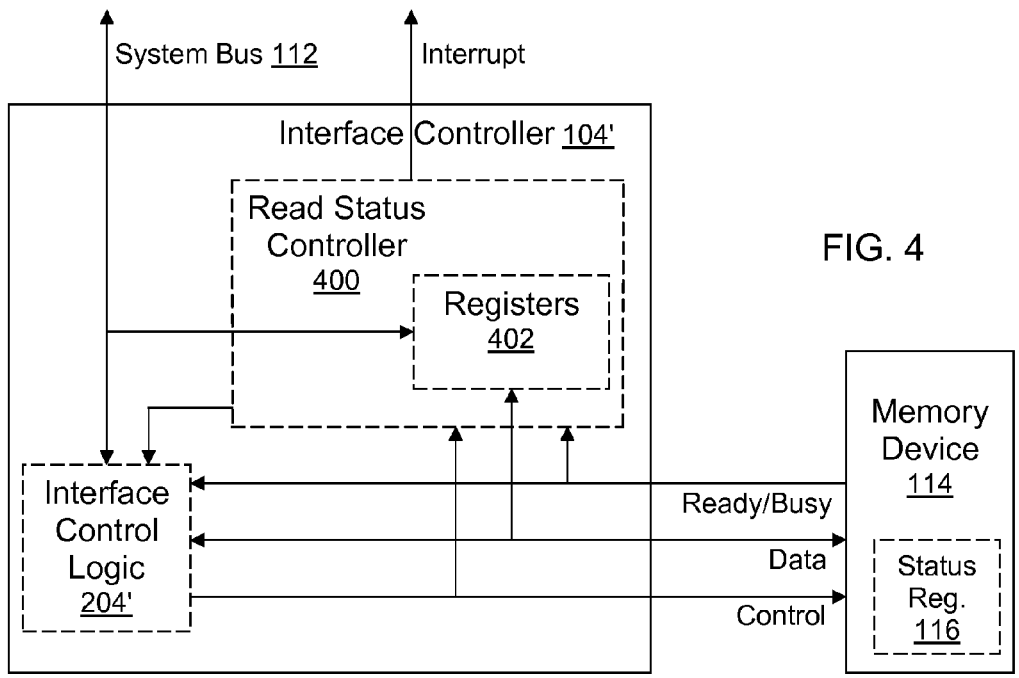

FIG. 4

| Status Register Bit | Name | Logic Level | Definition |
| --- | --- | --- | --- |
| 7 | Write Protection | High | Not protected |
| | | Low | Protected |
| 6 | Program/Erase/Read Controller | High | Device ready; controller inactive |
| | | Low | Device busy; controller active |
| | Cache Ready/Busy | High | Cache register ready |
| | | Low | Cache register busy |
| 5 | Program/Erase/Read Controller | High | Device ready; controller inactive |
| | | Low | Device busy; controller active |
| 4, 3, 2 | | Don't care | |
| 1 | Cache Program Error | High | Page N-1 fail |
| | | Low | Page N-1 OK |
| 0 | Generic Error | High | Operation failed |
| | | Low | Operation OK |
| | Cache Program Error | High | Page N failed |
| | | Low | Page N OK |

FIG. 5

READ STATUS CONTROLLER

BACKGROUND

This invention relates to electronic processing circuits and devices and more particularly to methods and devices for controlling data transfers between such circuits and devices.

Many electronic devices have processors that communicate with one or more external memory devices, such as hard disk drives, read-only memory cards, and flash memory cards. Today, flash memory accesses are controlled by a flash memory interface controller that is connected to a device's host processor via a system bus.

FIG. 1 is a block diagram of a processing system 100 that includes a typical arrangement for controlling flash memory accesses. In pertinent part, the system 100 includes a host processor 102 and an interface controller 104, and possibly various other devices 106, 108, 110, all of which communicate through a system bus 112. The interface controller 104 is in charge of transferring data to and from a flash memory device 114 using control and data bus signals that typically conform to widely followed standard practices in the flash memory industry. Besides exchanging data with the device 114, the controller 104 sends control signals to the device 114 and receives ready/busy signals from the device 114.

After each "page write", it is common for the memory device 114 to be queried by the host processor 102 in order to determine if the write operation was successful. The particular format of the command and contents of the response are set by the manufacturer of the memory device 114, but many manufacturers adhere to a de facto industry standard that specifies that the "read status" command is "0x70h" and that any response other than "0x00h" indicates an error. It will be understood that the command and response is written in hexadecimal notation, where x indicates a don't-care character.

One arrangement of such an interface controller is described in U.S. Pat. No. 5,457,787 to Asano et al., which states that it describes an interface circuit for a peripheral device that generates an interrupt request to a host in response to a data request from the peripheral device and drops the interrupt request if the status of the peripheral device is read by the host. The interface circuit detects that the host operates in a post-read mode, and responds to a post-read mode detect signal and the status reading by the host in order to enable the regeneration of the interrupt request to the host.

U.S. Pat. No. 6,249,461 to Choi et al., for example, describes a flash memory device that provides a "status read" operation for indicating its status of operation.

After each "page write" operation, the memory device is usually queried "read status" in order to determine if the write operation was successful. This is done by the host processor's issuing a standard "read status" command and then reading the response returned by the memory device. The usual "read status" operation is performed immediately after a flash memory device transfers a page of data from its internal buffer into its storage array. The end of this transfer is marked by the flash memory device's ready/busy signal output being de-asserted. The host processor detects the de-assertion and then issues the "read status" command.

A problem arises from the host processor's having to check every "read status" response. The host processor has to stop other system operations in order to issue a "read status" command, read the response, and upon encountering an error (which is usually rare) act accordingly. This degrades overall system performance, perhaps dramatically because the host processor may have to be diverted to service memory "read status" operations almost continuously. From another point of view, the problem is the excessive bandwidth required by the host processor to query the memory device status following a "page write" operation.

U.S. Pat. No. 5,640,349 to Kakinuma et al. describes a flash memory card having two flash memories and a flash memory controller having a pair of buffer memories and a pair of data busses. Because the data busses can operate in parallel, the transfer time between the host and the flash memory card is reduced. It does not describe either detecting a programmable bit sequence sent to the flash memory indicating whether a response will need to be read or tracking memory accesses (address and data in a multi-buffered queue scheme) that result in errors.

U.S. Pat. No. 6,985,778 to Kim et al. describes an interface between a host processor and a NAND flash memory, which includes a register that receives and stores a command from the host processor to control an operation of the NAND flash memory and an operation information to execute the command. A flash interface portion, also in the memory, controls a control signal to operate the NAND flash memory; outputs the command, the operation information, or the host data; and controls an input/output connection through which the data is input to the NAND flash memory. It does not describe either detecting a programmable bit sequence sent to the flash memory indicating whether a response will need to be read or tracking memory accesses (address and data in a multi-buffered queue scheme) that result in errors.

U.S. Pat. No. 5,799,168 to Ban describes a flash memory controller that translates generic commands from a processor into memory-circuit-specific commands, and vice versa. After writing or erasing, the controller automatically enters a "read status", and the controller can extract read-status information through pre-determined registers and software polling. It does not describe either detecting a programmable bit sequence sent to the flash memory indicating whether a response will need to be read or issuing an interrupt request upon encountering an error response.

SUMMARY

Instead of the usual "read status" operation, this invention lets a host processor attend to other system operations while a separate controller monitors a memory device. Such a controller issues "read status" commands, reads the responses, and automatically issues interrupts to the host processor when appropriate. Thus, the host processor is released for other operations, improving system performance.

In one aspect of the invention, there is provided a controller for a memory device in a processing system including a host processor, the host processor and the controller being connected by a system bus and the controller being in communication with the memory device. The controller includes logic configured to detect at least one programmable bit sequence sent to the memory device by the host processor; logic configured to issue to the memory device commands based on detected bit sequences; logic configured to read at least one response from the memory device to an issued command; and logic configured to send an interrupt request to the host processor based on at least one read response from the memory device. An interrupt request is sent to the host processor when a read status error has occurred.

In another aspect of the invention, there is provided a method of controlling a memory device in a processing system that further includes a host processor and a memory controller. The method includes the steps of sending a command to the memory device; reading, by the memory controller, a response to the command by the memory device; and if a read response indicates a read status error, then sending, by the memory controller, an interrupt request to the host processor.

In another aspect of the invention, there is provided a computer-readable medium having stored instructions that, when executed by the computer, cause the computer to carry out a method of controlling a memory device in a processing system that further includes a host processor and a memory controller. The method includes the steps of sending a command to the memory device; reading, by the memory controller, a response to the command by the memory device; and if a read response indicates a read status error, then sending, by the memory controller, an interrupt request to the host processor.

BRIEF DESCRIPTION OF THE DRAWINGS

The several objects, features, and advantages of Applicant's invention will be understood by reading this description in conjunction with the drawings, in which:

FIG. 4 is a block diagram of an improved interface controller;

FIG. 5 is an exemplary table identifying bits in a status register; and

DETAILED DESCRIPTION

Figure 1:
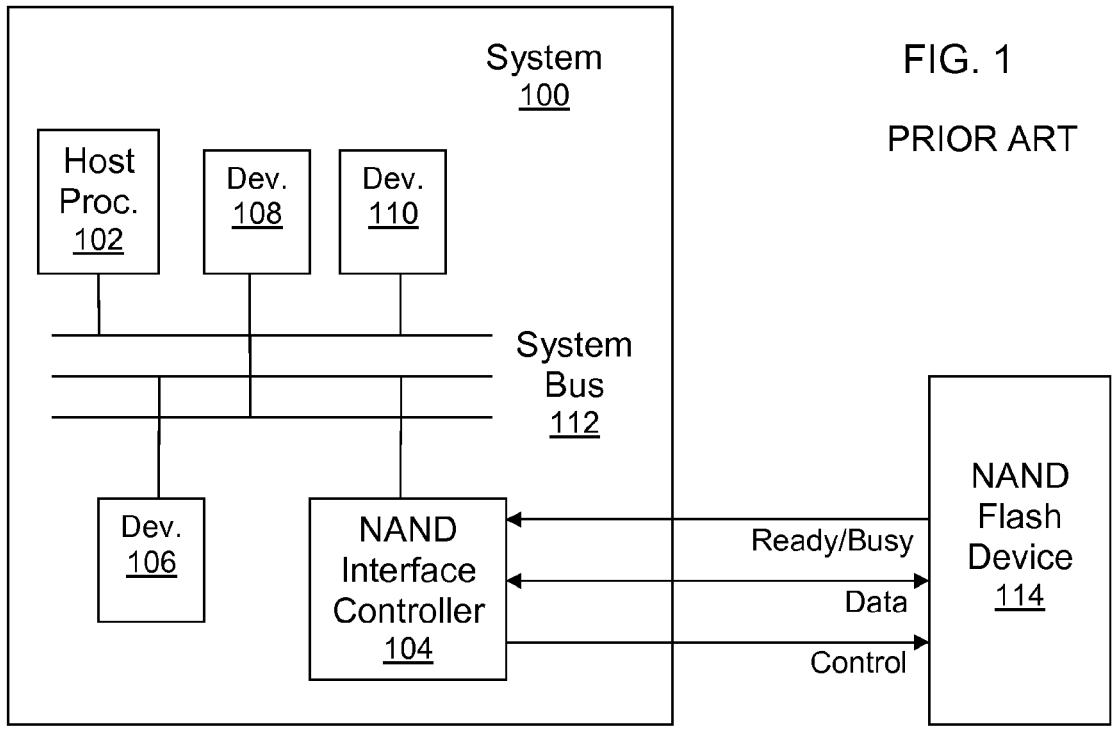
FIG. 1 is a block diagram of a processing system that includes a typical arrangement for controlling flash memory accesses.
Figure 2:
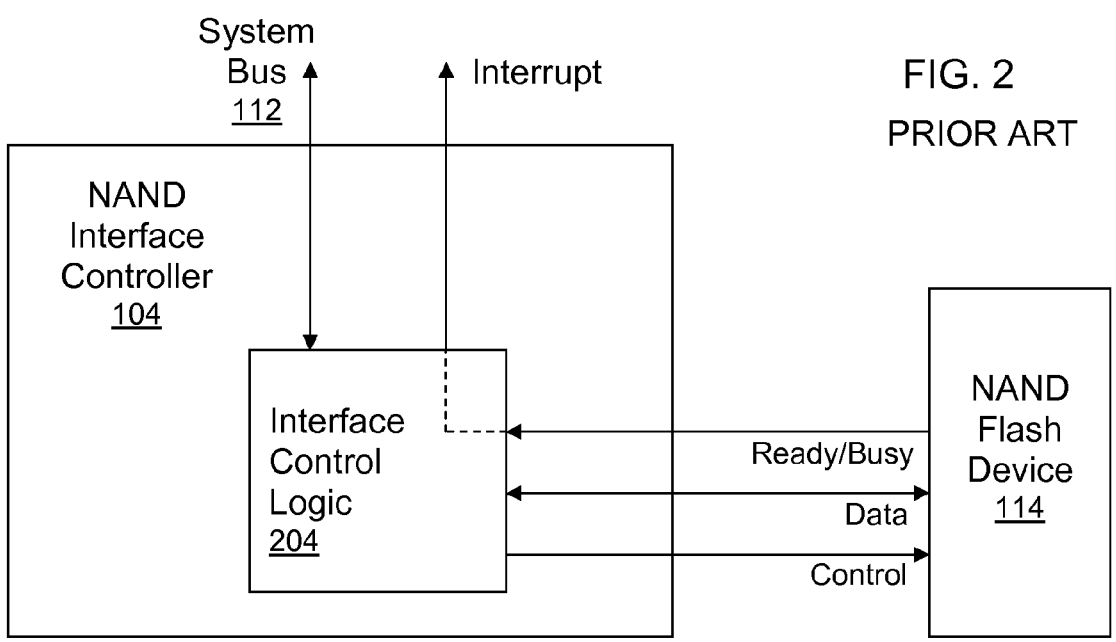
FIG. 2 is a block diagram of a typical interface controller.

In the usual arrangement depicted in FIG. 1, the interface controller 104 acts as a bridge between the system host processor 102 and the memory device 114 but does not alleviate system bandwidth degradation due to "read status" operations. FIG. 2 is a block diagram of a typical interface controller 104, showing its internal interface control logic 204, which handles the transfer of data and control signals through the system bus 112 and to and from the memory device 114 as described above.

As depicted in FIG. 2, the interface control logic 204 essentially just passes the ready/busy signals from the memory device 114 on to the host processor 102 as interrupt signals, which notify the host processor 102 that it has to issue "read status" commands, among other things. Thus, the host processor 102 is interrupted every time it needs to perform a "read status" operation.

Figure 3:
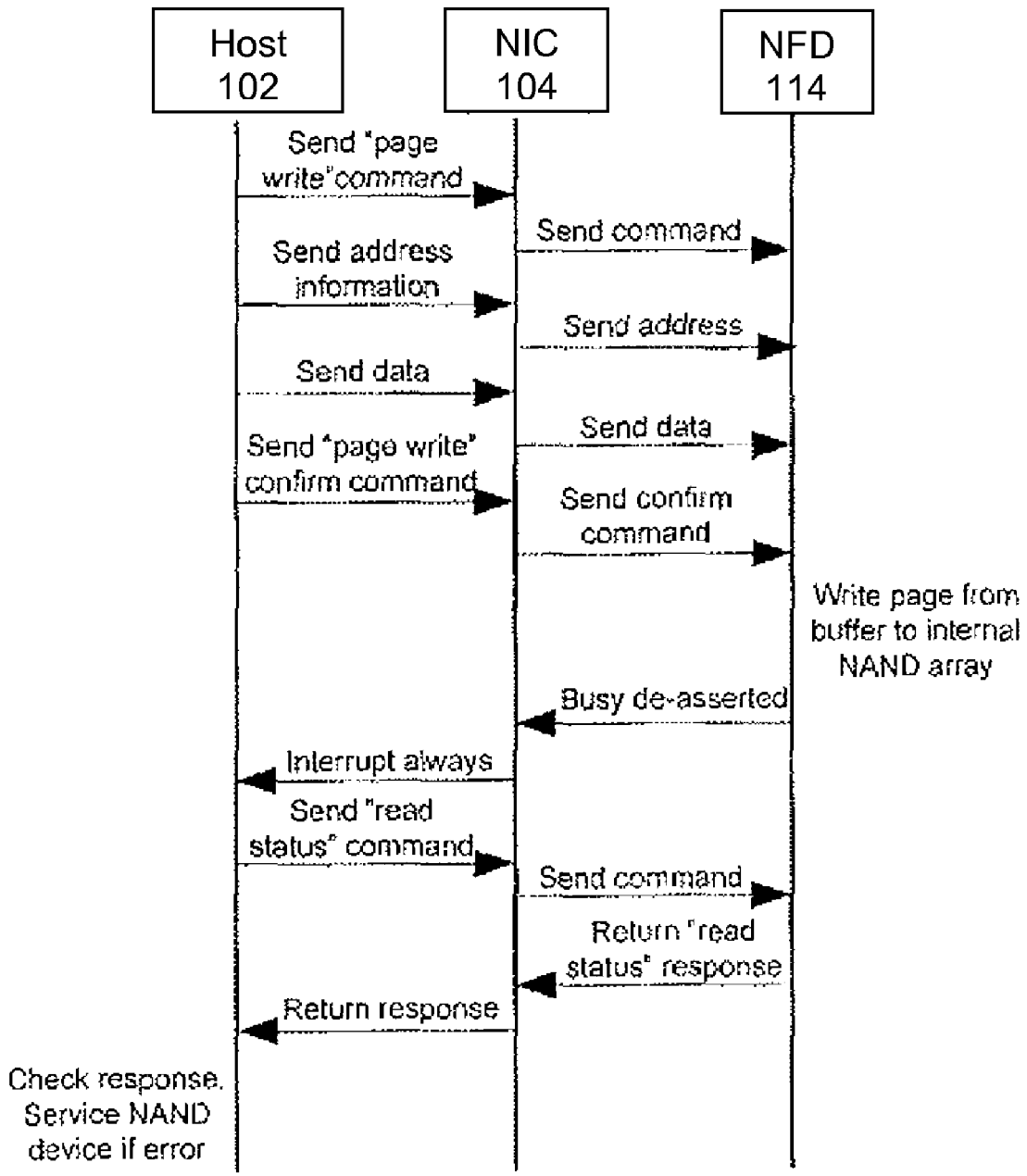
FIG. 3 is a diagram of a typical "page write" operation to an external memory device.

FIG. 3 is a diagram of a typical "page write" operation that requires the typical interrupt of the host processor 102. The operation begins with the host processor's sending a "page write" command to the interface controller 104, which responds by sending the appropriate command to the memory device 114. The host processor 102 then sends address information to the interface controller 104, which responds by sending an address to the memory device 114. The host processor 102 then sends the data to be stored to the interface controller 104, which responds by sending the data to the memory device 114, which stores the data temporarily in an internal buffer. The host processor 102 sends a "page write" confirm command to the interface controller 104, which responds by sending an appropriate confirm command to the memory device 114, with the result that the data is written from the buffer in the memory device 114 to a storage array in the device 114 with the previously sent address.

After the data is written to the storage array, the memory device 114 de-asserts its "busy" control signal, to which the interface controller 104 always responds by sending an interrupt signal to the host processor 102. In response to the interrupt signal, the host processor 102 sends a "read status" command to the interface controller 104, which sends the appropriate "read status" command to the memory device 114. In response to the "read status" command, the memory device 114 sends an appropriate "read status" response (e.g., no error) to the interface controller 104, which in turn sends an appropriate "read status" response to the host processor 102. The host processor 102 checks the "read status" response, and if the response indicates an error, the host processor 102 may execute a service operation or other investigation of the memory device 114.

It will be understood that the operation depicted in FIG. 3 is a time-consuming and host-processor intensive, thereby degrading system performance, e.g., slowing system operation. A delay on the order of microseconds is not uncommon for each "page write" operation.

The inventor has recognized that such performance degradation can be avoided by a read status controller (RSC) that monitors the memory device 114 and enables the host processor 102 to attend to other system operations. The RSC issues "read status" commands, reads the responses, and when appropriate issues interrupts to the host processor 102 automatically, i.e., without involvement of the host processor 102. This releases the host processor for other operations, increasing overall system performance. Instead of the usual "read status" operation depicted in FIG. 3, the host processor 102 can attend to other system operations while the RSC monitors the memory device 114.

FIG. 4 is a block diagram of an improved interface controller 104'. As depicted in FIG. 4, an RSC 400 can be included in an otherwise conventional interface controller 104' and work in parallel with its otherwise conventional interface control logic 204'. The RSC 400 can be implemented by a suitably configured application-specific integrated circuit (ASIC), field-programmable gate array (FPGA), programmable processor, or equivalent logic. The artisan will understand that the typical interface controller 104 is often implemented in the same way. The artisan will also understand that although this description focuses mainly on flash memory devices, this invention can be employed with any memory device that has a suitable "read status" query command and response structure.

The RSC 400 monitors the control and data lines of the system bus 112, looking for the specific set of signal patterns that represent a "page write" operation. These patterns can be programmed into the RSC 400 through the system bus 112 and stored in registers 402 internal to the logic of the RSC 400. As information passes the RSC 400 on the system bus, the RSC 400 compares the information stream to the stored pattern(s), and if a stored pattern is detected in the information on the system bus, an appropriate operation of the RSC is triggered. Thus, the RSC 400 can be flexible enough to detect any known signal sequence on the control and data lines of the system bus 112, as well as on the control and data lines to the memory device 114. The artisan will understand how to configure an ASIC, FPGA, etc. to store the patterns, compare the system bus activity to the stored patterns, and detect the presence of a pattern.

Upon detecting a known signal pattern and thus the execution of a "page write" operation, the RSC 400 monitors the ready/busy signal output of the memory device 114 that is also provided to the interface control logic 204'. After "busy" is de-asserted, the RSC 400 automatically issues the appropriate "read status" command to the device 114. The RSC 400 then reads the response from the memory device 114. If the RSC 400 encounters an error, e.g., the RSC 400 detects a response other than "0x00h" or another appropriate stored pattern, the RSC 400 can issue an interrupt to the host processor 102, and can temporarily prevent the interface control logic 204' from issuing an interrupt, if desired. Due to the currently non-standardized nature of the "read status" command and response codes, a conventional interface controller 204 typically does not monitor such operation. Thus, it is advantageous for the "read status" command and expected response(s) to be programmable within the registers 402.

As noted above, a list of valid "read status" responses can be programmed into internal registers 402 in the RSC 400 through the system bus 112. Additional interrupt conditions can also be programmed into the RSC 400 through the system bus, enabling the RSC to control interrupts to the host processor 102 for other responses.

For example, a "read status" command typically queries the contents of a status register 116 on board the memory device 114 that typically has eight bits. FIG. 5 is an exemplary table that shows each memory device's status register (SR) bit, its name, and definitions for the two values (logic levels) of the bit. The information in FIG. 5 corresponds to the NAND01G-B and NAND02G-B NAND Flash Memory devices made by STMicroelectronics, Geneva, Switzerland, but it will be understood that a wide variety of other devices, and other names and definitions can be used. As shown in FIG. 5, the SR6 and SR0 bits have different meanings during "cache program" and "cache read" operations, and the SR5 and SR1 bits may be valid only for "cache program" operations; for other operations, the SR5 bit may be the same as the SR6 bit and the SR1 bit may be "don't care".

In accordance with this invention, the RSC 400 can check for various different states, or values, of a memory device's status register 116 besides a "0x00h" response to a "read status" command. The RSC 400 can read the memory device's status register 116 with a "mask" that enables the RSC 400 to ignore certain bits in the status register and thereby check only specific status information. With such a mask, certain bits in the memory device's status register 116 can be ignored and the RSC 400 can still generate an interrupt signal on a non-"0x00h" response programmed in the registers 402. For convenience of description in this application, read-status errors and particular states of the status register 116 identified by suitable masks are called "read status errors" in this application.

Figure 6:
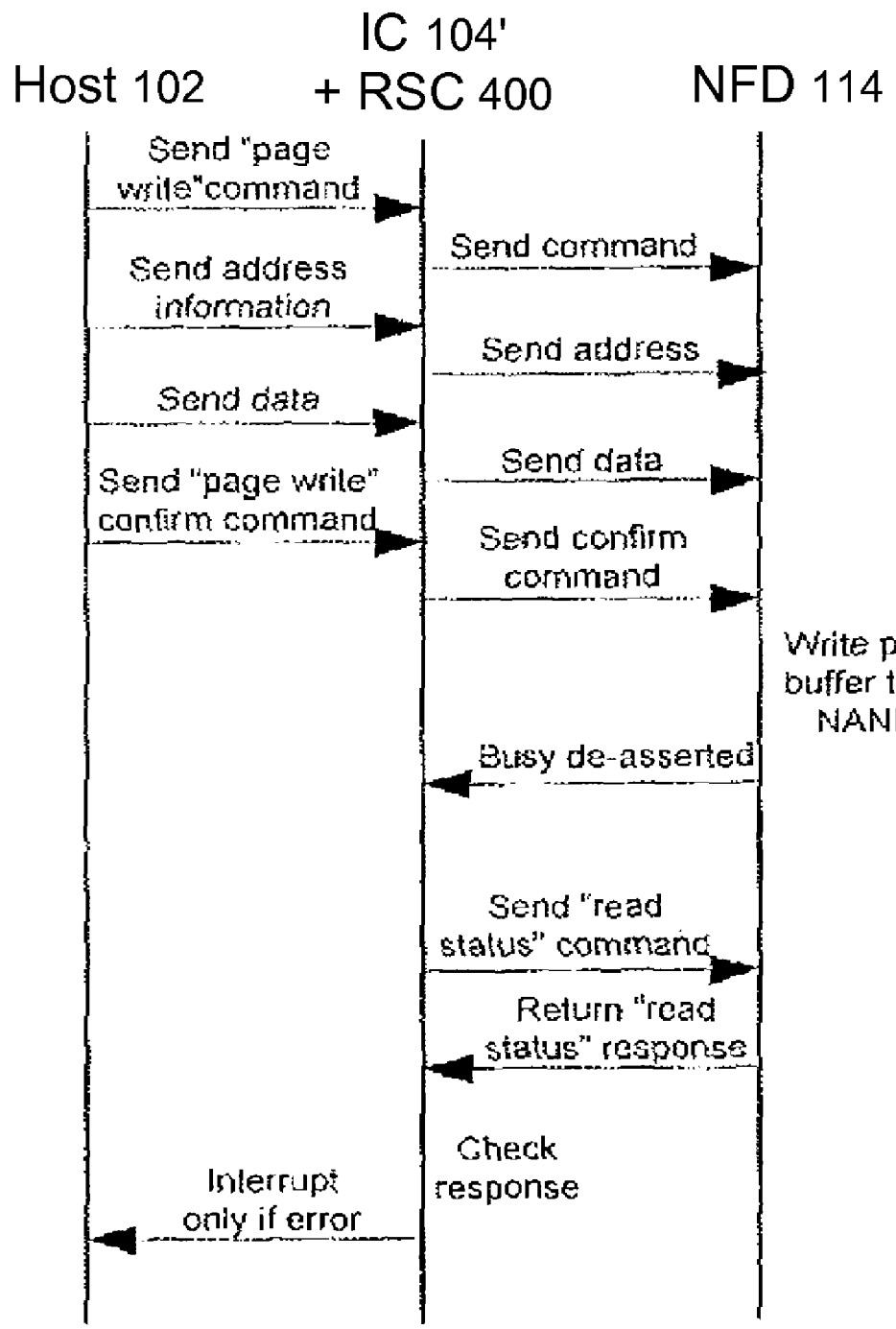
FIG. 6 is a diagram of an improved "page write" operation to an external memory device.

FIG. 6 is a diagram of a "page write" operation with the RSC, and it will be noted that in contrast to FIG. 3, the host processor 102 does NOT need to be interrupted for every "page write" operation. The host processor 102 is interrupted only when a "read status" error occurs. Thus, a benefit of an RSC as described in this application is that unless a "read status" error is encountered, the host processor can service other system-level tasks.

The operation begins in FIG. 6 with the host processor's sending a "page write" command to the interface controller 104', which responds by sending the appropriate command to the memory device 114. The host processor 102 then sends address information to the interface controller 104', which responds by sending an address to the memory device 114. The host processor 102 then sends the data to be stored to the interface controller 104', which responds by sending the data to the memory device 114, which stores the data temporarily in an internal buffer. The host processor 102 sends a "page write" confirm command to the interface controller 104', which responds by sending an appropriate confirm command to the memory device 114, with the result that the data is written from the buffer in the memory device 114 to a storage array in the device 114 with the previously sent address.

After the data is written to the storage array, the memory device 114 de-asserts its "busy" control signal, to which the interface controller 104' responds by sending an appropriate "read status" command to the memory device 114. In response to the "read status" command, the memory device 114 sends an appropriate "read status" response (e.g., no error) to the interface controller 104', which checks the response just as the host processor 102 would have done in the conventional operation. If the response indicates no error, then the interface controller 104', through the action of the RSC 400, does not send an interrupt signal to the host processor 102. If the response indicates an error, only then does the interface controller 104', through the action of the RSC 400, send an interrupt signal and the "read status" response to the host processor 102, which can act on that information accordingly.

It will be understood that the operation depicted in FIG. 6 is less time-consuming and host-processor intensive than the operation depicted in FIG. 3, and so system performance is relatively improved.

To assist in synchronizing interrupts with memory-device accesses, the RSC 400 may also monitor and store in its registers 402 the command and address data information transferred to the memory device 114. This is advantageous because, due to potential latency in the larger system 100, it is necessary to associate any interrupt that occurs with the specific access that produces the interrupt. The command and address information stored in the registers 402 or other suitable memory accessible by the RSC 400 acts as a marker to identify the violating page in the event an interrupt occurs. The registers 402 can be read through the system bus 112 by the host processor 102 upon servicing the interrupt.

It is currently believed that such a synchronization scheme would be used primarily for direct memory access (DMA) controllers or any other bus masters that would issue chains of multiple commands to the controller 104'. Because a "read status" interrupt issued by the controller 104' might not get to a bus master in time, the bus master might have started to issue commands for the next access before it receives the interrupt. Thus, an interrupt must be tied to the specific access that caused it, which can be done by writing the address of the access immediately before issuing the "read status" command. The address is advantageously written to the registers 402, and upon getting an interrupt, the bus master can query the registers 402 to determine which specific address caused the interrupt.

The interrupt scheme described above can thus facilitate multi-page autonomous transfers without involvement of the host processor 102, with the RSC 400 simply expediting a chain of accesses that have been programmed into a bus master or DMA controller. If there are no errors, a chain of commands can be issued to the controller 104' without stopping and without involving the host processor 102. The RSC 400 automates this portion of the command chain. For DMA controllers that cannot handle automatic checking of "read status" responses, decision-making logic (i.e., the RSC) helps the speed with which these multiple access are done.

It will be appreciated that the above-described RSC 400 can detect a programmable bit sequence sent to an external device, such as a memory 114, indicating whether a response from the external device needs to be read. The RSC 400 can also read a response from the external device and act appropriately, e.g., determine if a "read status" error has occurred by comparing the device's actual response to one or more programmably determined responses. Upon reading a particular response, e.g., a response indicating an error, the RSC can issue an interrupt request to a system processor for further action. The RSC can also track which access (address and data in a multi-buffered queue scheme) caused the particular response to occur.

It will be appreciated that procedures described above are carried out repetitively as necessary and that to facilitate understanding, many aspects of Applicant's invention are described in terms of sequences of actions that can be performed by, for example, elements of a programmable computer system. It will be recognized that various actions can be performed by specialized circuits (e.g., discrete logic gates interconnected to perform a specialized function or an ASIC), by program instructions executed by one or more processors, or by a combination of both.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A controller for a memory device in a processing system including a host processor, the host processor and the controller being connected by a system bus and the controller being in communication with the memory device, comprising:
   logic configured to detect at least one bit sequence that is programmable in the logic and sent to the memory device by the host processor that indicates whether a response will need to be read;
   logic configured to issue to the memory device commands based on detected bit sequences;
   logic configured to read, if the at least one programmable bit sequence is detected, at least one response from the memory device to an issued command; and
   logic configured to send an interrupt request to the host processor based on the read at least one response from the memory device, wherein an interrupt request is sent to the host processor when a read status error has occurred.

2. The controller of claim 1, wherein the at least one programmable bit sequence sent to the memory device indicates whether a response from the memory device needs to be read.

3. The controller of claim 1, wherein a read status error is determined to have occurred by comparing the at least one response from the memory device to a stored response.

4. The controller of claim 1, further comprising logic configured to track an address and data sent by the host processor that correspond to a particular response from the memory device.

5. The controller of claim 1, wherein the logic configured to send an interrupt request is configured to check for a state of a status register in the memory device with a mask.

6. The controller of claim 1, further comprising at least one register for storing the at least one programmable bit sequence.

7. A method of controlling a memory device in a processing system that further includes a host processor and a memory controller, comprising the steps of:
   detecting, in the memory controller, a command to be sent to the memory device by the host processor that indicates whether a response will need to be read, wherein the command is programmable in the memory controller;
   sending the command to the memory device that indicates whether a response will need to be read;
   reading, by the memory controller if the programmable command is detected, a response to the command by the memory device; and
   if the read response indicates a read status error, then sending, by the memory controller, an interrupt request to the host processor.

8. The method of claim 7, wherein the command sent to the memory device indicates whether a response from the memory device needs to be read.

9. The method of claim 7, wherein the step of sending an interrupt request comprises determining that a read response indicates a read status error by comparing the response by the memory device with a stored response.

10. The method of claim 7, further comprising a step of tracking an address and data sent by the host processor that correspond to a particular response by the memory device.

11. The method of claim 7, wherein the step of sending an interrupt request comprises checking for a state of a status register in the memory device with a mask.

12. The method of claim 7, further comprising a step of storing at least one expected response in the memory controller.

13. A computer-readable medium having stored instructions that, when executed by a computer, cause the computer to carry out a method of controlling a memory device in a processing system that further includes a host processor and a memory controller, wherein the method comprises the steps of:
   detecting, in the memory controller, a command to be sent to the memory device by the host processor that indicates whether a response will need to be read, wherein the command is programmable in the memory controller;
   sending the command to the memory device that indicates whether a response will need to be read;
   reading, by the memory controller if the command is detected, a response to the command by the memory device; and
   if the read response indicates a read status error, then sending, by the memory controller, an interrupt request to the host processor.

14. The computer-readable medium of claim 13, wherein the command sent to the memory device indicates whether a response from the memory device needs to be read.

15. The computer-readable medium of claim 13, wherein the step of sending an interrupt request comprises determining that a read response indicates a read status error by comparing the response by the memory device with a stored response.

16. The computer-readable medium of claim 13, wherein the method further comprises a step of tracking an address and data sent by the host processor that correspond to a particular response by the memory device.

17. The computer-readable medium of claim 13, wherein the step of sending an interrupt request comprises checking for a state of a status register in the memory device with a mask.

18. The computer-readable medium of claim 13, wherein the method further comprises a step of storing at least one expected response in the memory controller.

* * * * *

UNITED STATES PATENT AND TRADEMARK OFFICE
CERTIFICATE OF CORRECTION

| | | |
|---|---|---|
| PATENT NO. | : 7,966,445 B2 | Page 1 of 1 |
| APPLICATION NO. | : 11/963984 | |
| DATED | : June 21, 2011 | |
| INVENTOR(S) | : Hobler | |

It is certified that error appears in the above-identified patent and that said Letters Patent is hereby corrected as shown below:

On the Title Page, in Field (56), under "OTHER PUBLICATIONS", in Column 2, Line 3, delete "Syntheses," and insert -- Synthesis, --, therefor.

Signed and Sealed this
Twentieth Day of December, 2011

David J. Kappos
*Director of the United States Patent and Trademark Office*